(12) United States Patent
Seki et al.

(10) Patent No.: US 11,323,047 B2
(45) Date of Patent: May 3, 2022

(54) CONTACT BODY EASY TO VERIFY RESIN IMPREGNATION, MANUFACTURING METHOD THEREOF, AND VIBRATION ACTUATOR INCLUDING CONTACT BODY

(71) Applicant: CANON KABUSHIKI KAISHA, Tokyo (JP)

(72) Inventors: Hiroyuki Seki, Oyama (JP); Yasuyuki Araki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 276 days.

(21) Appl. No.: 16/656,714

(22) Filed: Oct. 18, 2019

(65) Prior Publication Data

US 2020/0136529 A1 Apr. 30, 2020

(30) Foreign Application Priority Data

Oct. 24, 2018 (JP) .............................. JP2018-200209

(51) Int. Cl.

| | |
|---|---|
| *H02N 2/12* | (2006.01) |
| *C09K 3/14* | (2006.01) |
| *H02N 2/04* | (2006.01) |
| *H01L 41/04* | (2006.01) |
| *H02N 2/00* | (2006.01) |
| *H02N 2/16* | (2006.01) |

(52) U.S. Cl.
CPC ................. *H02N 2/12* (2013.01); *C09K 3/14* (2013.01); *H01L 41/04* (2013.01); *H02N 2/001* (2013.01); *H02N 2/0065* (2013.01); *H02N 2/0075* (2013.01); *H02N 2/04* (2013.01); *H02N 2/163* (2013.01)

(58) Field of Classification Search
CPC .......... H02N 2/12; H02N 2/04; H02N 2/0075; H02N 2/163; H02N 2/0065; H02N 2/001; H02N 2/0015; H02N 2/103; H02N 2/007; H01L 41/04; C09K 3/14
See application file for complete search history.

(56) References Cited

U.S. PATENT DOCUMENTS 5,311,094 A * 5/1994 Imasaka ................. H02N 2/166
310/323.11
2002/0178658 A1* 12/2002 Tominaga ................ C09K 3/14
51/298

(Continued)

FOREIGN PATENT DOCUMENTS

JP 2017225333 A 12/2017

*Primary Examiner* — Emily P Pham
(74) *Attorney, Agent, or Firm* — Rossi, Kimms & McDowell LLP

(57) ABSTRACT

A contact body that makes it possible to easily verify whether or not the resin has been properly impregnated in the pores. A metallic sintered body having a plurality of pores, as a main body, is in contact with a vibration element in a vibration actuator. The contact body includes a sliding portion that has a sliding surface in contact with the vibration element, and a non-sliding portion adjacent to the sliding portion and not in contact with the vibration element. The non-sliding portion is provided with a resin lump containing hard particles and resin, and the resin lump is formed to be lower in height in a vertical direction than the sliding surface. In the sliding portion, part of hard particles and resin is exposed on the sliding surface.

10 Claims, 7 Drawing Sheets

(56) References Cited

U.S. PATENT DOCUMENTS

2011/0227453 A1* 9/2011 Araki .................. H02N 2/0015
310/323.02
2014/0319966 A1* 10/2014 Seki ....................... G02B 7/102
310/323.16

* cited by examiner

CONTACT BODY EASY TO VERIFY RESIN IMPREGNATION, MANUFACTURING METHOD THEREOF, AND VIBRATION ACTUATOR INCLUDING CONTACT BODY

BACKGROUND OF THE INVENTION

Field of the Invention

The present invention relates to a vibration actuator, and more particularly to a contact body brought into contact with a vibration element, and a manufacturing method of the contact body.

Description of the Related Art

As a vibration actuator that moves a vibration element and a contact body relative to each other by bringing the vibration element and the contact body into contact with each other and exciting vibration in the vibration element, there are known vibration actuators having various structures. The vibration actuator makes use of a frictional force generated between the vibration element and the contact body as a driving force, and hence the vibration actuator is capable of generating large torque at low speed. On the other hand, the vibration actuator has a problem that since the frictional force generated between the vibration element and the contact body is used, the torque is lowered under a high-humidity environment. More specifically, in a case where the vibration actuator has been left under a high-humidity environment, fine water droplets are attached to sliding surfaces (frictional surfaces) of the vibration element and the contact body in sliding contact with each other, e.g. due to dew condensation. If such water droplets (moisture) are caught between the sliding surfaces of the vibration element and the contact body, a thin water film is formed to lower a friction coefficient, causing reduced torque. As a result, after the vibration actuator has been left under a high humidity environment, the starting performance is lowered, and in an extreme case, there arises a problem that it is impossible to start the vibration actuator.

To solve the above-mentioned problem, there have been proposed various techniques. For example, Japanese Laid-Open Patent Publication (Kokai) No. 2017-225333 has proposed, as a material used for a sliding portion of a contact body (frictional material), a material formed by impregnating resin containing hard particles in pores of a porous metallic sintered body. In the frictional material described in Japanese Laid-Open Patent Publication (Kokai) No. 2017-225333, the resin impregnated in the pores contributes to improvement of wear resistance and the hard particles exhibit spike effects, whereby it is possible to maintain a high friction coefficient even under a high-humidity environment or even after the material has been left under a high-humidity environment.

In the frictional material described in Japanese Laid-Open Patent Publication (Kokai) No. 2017-225333, to maintain the stable frictional force, it is important that the resin is impregnated in the pores of the metallic sintered body at a proper ratio, that the resin is appropriately exposed on the sliding surface, and that the hard particles disperse in the resin at a proper ratio. However, in the frictional material described in Japanese Laid-Open Patent Publication (Kokai) No. 2017-225333, it is not easy to know the ratio of the resin impregnated in the pores of the metallic sintered body, the ratio of the hard particles in the resin, and the degree of dispersion of the hard particles in the resin.

For example, to check whether the resin has been impregnated in the pores of the metallic sintered body, it is required to perform magnified observation using a microscope or the like. However, an area of each pore appearing on the sliding surface is small, and hence it is not easy to confirm resin in the pores, and it is not easy to confirm hard particles in the resin, either. Thus, according to the conventional technique, it is not easy to verify, after manufacturing, whether resin has been properly impregnated in pores of the metallic sintered body of the contact body which is formed by impregnating the resin in the pores of the metallic sintered body.

SUMMARY OF THE INVENTION

The present invention provides a contact body that is formed by impregnating resin in pores of a metallic sintered body and makes it possible to easily verify, after manufacturing, whether or not the resin has been properly impregnated in the pores, a manufacturing method of the contact body, and a vibration actuator including the contact body.

In a first aspect of the present invention, there is provided a contact body that has a metallic sintered body having a plurality of pores, as a main body, and is brought into contact with a vibration element in a vibration actuator, comprising a sliding portion that has a sliding surface in contact with the vibration element, and a non-sliding portion that is adjacent to the sliding portion and is not in contact with the vibration element, wherein the non-sliding portion is provided with a resin lump containing hard particles and resin, and the resin lump is formed such that the resin lump is lower in height in a vertical direction than the sliding surface, and wherein in the sliding portion, part of hard particles and resin is exposed on the sliding surface.

In a second aspect of the present invention, there is provided a vibration actuator including a vibration element, and a contact body that has a metallic sintered body having a plurality of pores, as a main body, wherein the contact body comprises a sliding portion that has a sliding surface in contact with the vibration element, and a non-sliding portion that is adjacent to the sliding portion and is not in contact with the vibration element, wherein the non-sliding portion is provided with a resin lump containing hard particles and resin, and the resin lump is formed such that the resin lump is lower in height in a vertical direction than the sliding surface, and wherein in the sliding portion, part of hard particles and resin is exposed on the sliding surface.

In a third aspect of the present invention, there is provided a method of manufacturing a contact body that has a metallic sintered body having a plurality of pores, as a main body, and is brought into contact with a vibration element in a vibration actuator, comprising applying mixed resin formed by mixing hard particles and resin to a first surface of the metallic sintered body and a second surface of the metallic sintered body, which is provided at a height lower than the first surface such that the second surface is adjacent to the first surface, performing heat treatment for impregnating the mixed resin applied to the metallic sintered body in the pores of the metallic sintered body and curing the mixed resin, and removing remaining mixed resin on the first surface, which has been cured, by grinding, and adjusting flatness of the first surface, wherein a resin lump formed on the second surface by the mixed resin which is cured by the heat treatment is not ground by said grinding.

According to the present invention, it is possible to easily verify, after manufacturing the contact body by impregnating resin in the pores of the metallic sintered body, whether or not the resin has been properly impregnated in the pores.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
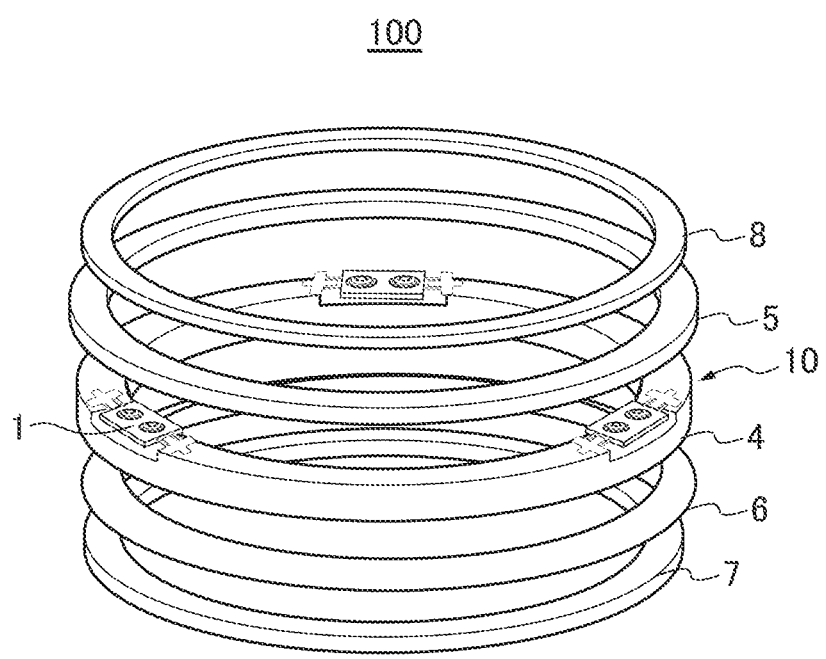
FIG. 1 is an exploded perspective view showing the general arrangement of a vibration actuator according to a first embodiment of the present invention.
Figure 2A:
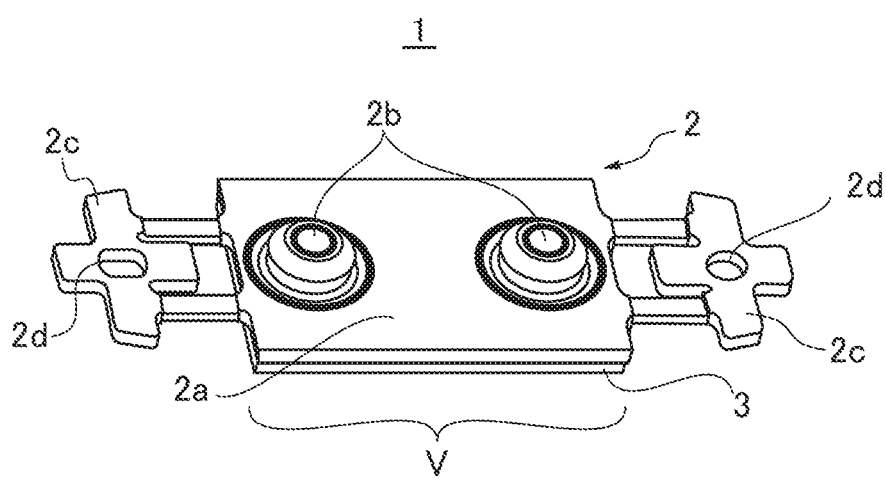
FIGS. 2A to 2C are views useful in explaining the arrangements of a vibration element, a vibration element unit, and a contact body, as components of the vibration actuator.
Figure 2B:
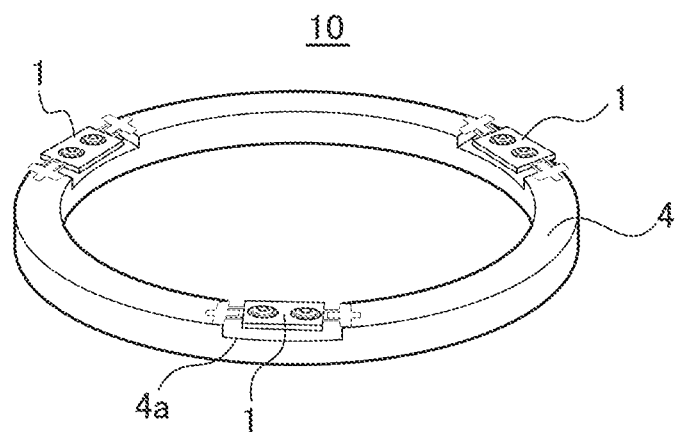
Figure 2C:
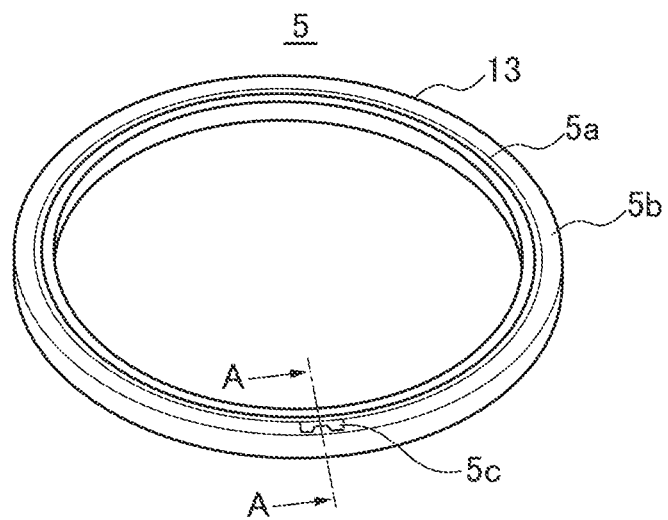

FIG. 1 is an exploded perspective view showing the general arrangement of a vibration actuator 100 according to a first embodiment of the present invention. FIG. 2A is a perspective view showing the general arrangement of a vibration element 1 used for the vibration actuator 100. FIG. 2B is a perspective view showing the general arrangement of a vibration element unit 10 (stator) including the vibration elements 1. FIG. 2C is a perspective view showing the general arrangement of a contact body 5 (rotor) as a component of the vibration actuator 100.

The vibration actuator 100 includes a cushion ring 8, the contact body 5, the vibration element unit 10, a pressure ring 6, and a set ring 7, each of which has an annular shape, and these components are stacked in an axial direction to thereby form an annular shape, as a whole, of the vibration actuator 100.

The vibration element unit 10 includes the three vibration elements 1 and a holding member 4 having a ring shape for holding the three vibration elements 1. Each vibration element 1 includes an elastic body 2 having a plate shape. The elastic body 2 has a rectangular portion 2a in a central portion thereof in a longitudinal direction (first direction). A piezoelectric element 3 (electromechanical energy conversion element) is bonded to one surface of the rectangular portion 2a, and protrusions 2b protruding in a direction of the thickness of the elastic body 2 (second direction) are formed on the other surface (surface opposite from the surface to which the piezoelectric element 3 is bonded) at a predetermined interval in the first direction. The rectangular portion 2a, the protrusions 2b, and the piezoelectric element 3 form a vibration section V in the vibration element 1. The elastic body 2 also includes supporting portions 2c extending from the rectangular portion 2a in the first direction, and a hole 2d is formed in each of the two supporting portions 2c. A flexible printed circuit board (not shown) for supplying electric power to the piezoelectric element 3 is attached to the piezoelectric element 3.

One surface of the holding member 4 as a component of the vibration element unit 10 is formed with recessed portions 4a at respective locations where the whole circumference of the holding member 4 is approximately equally divided into three. Each vibration element 1 is held by the holding member 4 such that the holes 2d of the supporting portions 2c of the elastic body 2 are positioned and fixed with respect to the holding member 4 in a state in which the vibration section V is accommodated in one of the recessed portions 4a so as not to be brought into direct contact with the holding member 4. To fix each vibration element 1 to the holding member 4, for example, it is possible to employ a method of providing fitting protrusions to be fitted in the holes 2d of the supporting portions 2c of the elastic body 2 in the vicinity of each recessed portion 4a of the holding member 4, fitting the fitting protrusions into the holes 2d, and bonding the former to the latter with an adhesive, but the fixing method is not limited to this.

The contact body 5 refers to a member which is brought into contact with the vibration elements 1 and is moved by vibration excided in the vibration elements 1, relative to the vibration elements 1. In the present embodiment, the contact body 5 has a metallic sintered body 13 having an annular shape, which is formed by sintering metallic powder, as a main body (base member), and is formed with a sliding portion 5a brought into contact with the vibration elements 1 on one surface thereof in the axial direction, with the other surface of the contact body 5 in the axial direction being brought into close contact with the cushion ring 8. In the sliding portion 5a, hard particles and resin are impregnated in a multiplicity of pores formed in the metallic sintered body 13. Further, at least part of the hard particles and the resin, which are impregnated in the metallic sintered body 13, is exposed on a surface of the sliding portion 5a (hereinafter referred to as the "sliding surface"). Details of the organization and the structure of the contact body 5 will be described hereinafter.

In the vibration actuator 100, the vibration element unit 10 and the contact body 5 are arranged such that the protrusions 2b of the vibration elements 1 are brought into contact with the sliding portion 5a of the contact body 5. On a rear surface side of the vibration element unit 10 (surface opposite from the surface on which the vibration elements 1 are arranged), the pressure ring 6 and the set ring 7 are arranged, and the set ring 7 is fixed to a fixing member (not shown). The vibration element unit 10 is pressed against the contact body 5 by the elastic force of the pressure ring 6, which is generated by the set ring 7 compressing the pressure ring 6, whereby the vibration elements 1 are brought into contact with the sliding portion 5a of the contact body 5 with a predetermined force. On the other hand, the contact body 5 is connected via the cushion ring 8 to an output transfer section (not shown) which is rotatably arranged. The cushion ring 8 is formed of e.g. rubber, and brings the contact body 5 and the output transfer section into close contact with each other.

An AC voltage having a predetermined frequency is applied from a power supply (not shown) to the piezoelectric element 3 via the flexible printed circuit board. With this, it is possible to excite vibration in a first vibration mode in which the protrusions 2b are reciprocally displaced in the second direction, and vibration in a second vibration mode in which the protrusions 2b are reciprocally displaced in the first direction, in the vibration section V of each vibration element 1. By exciting vibration in the first vibration mode and vibration in the second vibration mode with a predetermined phase difference and combining these modes of vibration, it is possible to cause the tip ends of the protrusions 2b to perform elliptical motion within a plane including the first direction and the second direction to thereby apply a frictional driving force from the protrusions 2b to the sliding portion 5a. Each vibration element 1 is arranged such that a straight line connecting the two protrusions 2b becomes a line tangent to the circumference of the contact body 5, and therefore, the vibration elements 1 apply the frictional driving force in the tangential direction of the contact body 5. As a result, the contact body 5 is rotated in unison with the cushion ring 8 and the output transfer section by the frictional driving force received from the vibration elements 1, whereby the rotational driving force is output to the outside via the output transfer section.

Figure 3A:
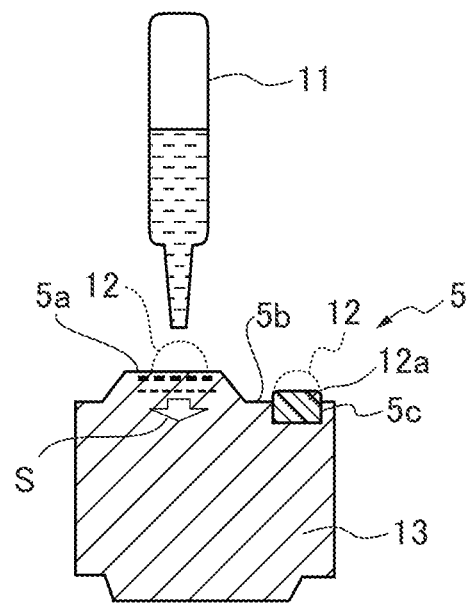
FIGS. 3A and 3B are schematic views useful in explaining a process for manufacturing the contact body.

Next, the manufacturing method and the structure of the contact body 5 will be described in detail. FIG. 3A is a schematic view useful in explaining the process for manufacturing the contact body 5. The metallic sintered body 13 as the main body of the contact body 5 is manufactured by using a known manufacturing method. Part of the metallic sintered body 13, appearing in FIG. 3A, corresponds to a cross-section of the contact body 5, taken along A-A in FIG. 2C. Although in the present embodiment, #8000 particles of GC (green carbon) are used as the hard particles, and a two-liquid epoxy adhesive, in which first liquid (base resin) and second liquid (curing agent) are mixed when used, is used as the resin, these are not limitative.

One of the liquids (e.g. the first liquid) of the epoxy adhesive and the hard particles are mixed in advance, and the first liquid containing the hard particles and the second liquid are set in a two-liquid mixing dispenser (not shown). The dispenser includes two containers for storing the respective liquids, and a static mixer syringe 11 (hereinafter referred as the "syringe 11"), connected to the two containers, for mixing the liquids stored in the respective containers and applying the mixed liquid. The syringe 11 and the metallic sintered body 13 are positioned with respect to each other, and the epoxy adhesive containing the hard particles (hereinafter referred to as the "particle-mixed resin 12") is applied to substantially the central portion of an upper surface (first surface) (referred to as the "application surface" in the following description, as deemed appropriate) of the metallic sintered body 13, which corresponds to the sliding portion 5a. With this, the particle-mixed resin 12 is annularly applied on the application surface. Note that, to prevent the particle-mixed resin 12 from being insufficient when heat treatment is performed afterwards for impregnating the particle-mixed resin 12 into the pores of the metallic sintered body 13 and curing the same, the amount of the particle-mixed resin 12 to be applied is set such that the particle-mixed resin 12 remains on the application surface after the heat treatment.

The position of the syringe 11 is moved after applying the particle-mixed resin 12 on the upper surface of the metallic sintered body 13. More specifically, the syringe 11 is moved to a recessed portion 5c formed in a flat surface 5b (non-sliding portion) (second surface) formed on an outer peripheral side of the upper surface at a location lower than the upper surface, and the particle-mixed resin 12 is applied (filled) to the recessed portion 5c. The particle-mixed resin 12 thus applied from the syringe 11 onto the upper surface and the recessed portion 5c of the metallic sintered body 13 form shapes in cross-sectional which are each substantially dome-shaped, as indicated by dotted lines in FIG. 3A.

The heat treatment for impregnating the applied particle-mixed resin 12 into the pores of the metallic sintered body 13 and curing the particle-mixed resin 12 can be performed e.g. by leaving the metallic sintered body 13 to which the particle-mixed resin 12 has been applied in an oven set to approximately 80° C. for about one hour. The heat treatment conditions are only required to be set according to the properties of the resin used. An arrow S in FIG. 3A schematically represents how the particle-mixed resin 12 applied on the upper surface of the metallic sintered body 13 is impregnated into the pores of the metallic sintered body 13. Although not shown, the particle-mixed resin 12 is also impregnated into part around the recessed portion 5c.

As mentioned above, since the amount of the particle-mixed resin 12 to be applied on the upper surface of the metallic sintered body 13 so as to form the sliding surface 5a is set such that the particle-mixed resin 12 remains on the application surface after this heat treatment, it is necessary to remove the resin remaining on the application surface after the heat treatment. Therefore, after the heat treatment, grinding is performed for removing the remaining resin and adjusting the flatness of the sliding surface of the sliding portion 5a to a predetermined value. Further, polishing is performed for adjusting surface roughness and the like of the sliding surface of the sliding portion 5a, whereby the contact body 5 including the sliding portion 5a having the surface adjusted to a predetermined surface roughness is obtained.

Figure 3B:
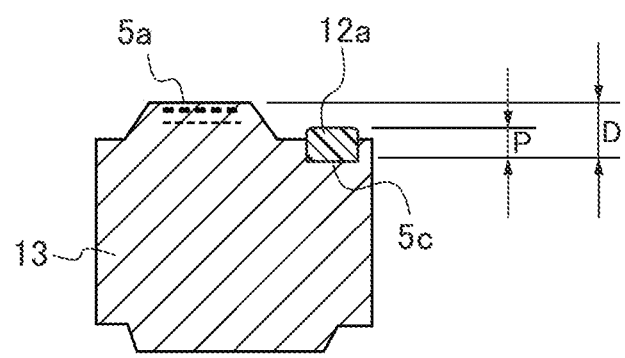

FIG. 3B is a cross-sectional view useful in explaining the structure of the contact body 5, taken along A-A in FIG. 2C. Similar to the particle-mixed resin 12 remaining on the application surface after the heat treatment, a lump of resin (hereinafter referred to as the "resin lump portion 12a"), which is formed by the particle-mixed resin 12 applied (filled) in the recessed portion 5c and cured, remains in the recessed portion 5c after the heat treatment.

The resin lump portion 12a is formed such that the topmost surface thereof is lower than the sliding surface of the sliding portion 5a. That is, the amount of the particle-mixed resin 12 to be applied in the process for applying the same is adjusted such that the height P of the resin lump portion 12a is lower than the height D from a bottom surface of the recessed portion 5c to the sliding surface of the sliding portion 5a. This prevents the resin lump portion 12a from being scraped when surface treatment (grinding and polishing) of the sliding portion 5a is performed. Therefore, in the contact body 5, even after manufacturing (surface treatment) of the contact body 5, the surface of the resin lump portion 12a after the curing treatment is maintained in the smooth state, and hence it is possible to clearly observe the organization of the resin lump portion 12a using an optical microscope.

The sliding portion 5a of the contact body 5 manufactured as described above has an organization in which the particle-mixed resin 12 has been impregnated in the pores of the metallic sintered body 13 and cured, and the epoxy adhesive and hard particles impregnated in the pores are exposed on part of the sliding surface of the sliding portion 5a. The epoxy adhesive and hard particles are exposed on the sliding surface of the sliding portion 5a as a measure for suppressing lowering of the friction coefficient between the vibration element 1 and the sliding portion 5a of the contact body 5 under a high-humidity environment, similarly to the technique described in Japanese Laid-Open Patent Publication (Kokai) No. 2017-225333, referred to as the conventional technique.

Here, the effect of suppressing lowering of the friction coefficient between the vibration element 1 and the sliding portion 5a of the contact body 5 is influenced by the number of hard particles exposed on the sliding surface of the sliding portion 5a and the dispersion state of the hard particles. Therefore, even under a high humidity environment, to maintain the friction coefficient between the vibration element 1 and the sliding portion 5a within a fixed range equivalent to a range of the friction coefficient under a general humidity environment and stably maintain the output performance of the vibration actuator 100, it is important to control the number of hard particles on the sliding surface of the sliding portion 5a and the dispersion state of the same.

In general, in the process for manufacturing the contact body 5, a mixture ratio or the like of hard particles to resin used for impregnation into the metallic sintered body 13 is controlled, but a situation in which a specified amount of hard particles has not been mixed in the resin e.g. due to a failure of a manufacturing apparatus can be expected to occur. Further, a situation in which the contact body 5 is manufactured without applying a sufficient amount of particle-mixed resin due to insufficiency of the particle-mixed resin or an operation failure of the syringe in the process for applying the particle-mixed resin can be expected to occur. Therefore, from the viewpoint of quality control, it is important to enable, after completion of the contact body 5, verification of whether or not a predetermined amount of hard particles and resin have been impregnated in the sliding portion 5a of the contact body 5 as a product obtained after completion of the manufacturing process.

In view of this, the contact body 5 is provided with the flat surface 5b, lower in height than the sliding portion 5a, in the area outside the sliding portion 5a, and the resin lump portion 12a is formed in the recessed portion 5c provided in the flat surface 5b. With this, the resin lump portion 12a is observed using e.g. an optical microscope to inspect (observe) the mixture ratio and the dispersion state of the hard particles with respect to the resin in the resin lump portion 12a, whereby it is possible to estimate the mixture ratio and the dispersion state of the hard particles in the particle-mixed resin impregnated in the sliding portion 5a. Further, by inspecting whether or not the resin lump portion 12a has a predetermined size, it is also possible to verify whether or not a predetermined amount of the particle-mixed resin 12 has been applied to the application surface of the metallic sintered body 13. After the contact body 5 using the metallic sintered body 13 has been manufactured, it is possible to easily verify from the above-mentioned inspection results whether or not the particle-mixed resin 12 has been properly impregnated in the pores of the metallic sintered body 13 and easily judge whether the contact body 5 is a normal product or a defective product.

Figure 4A:
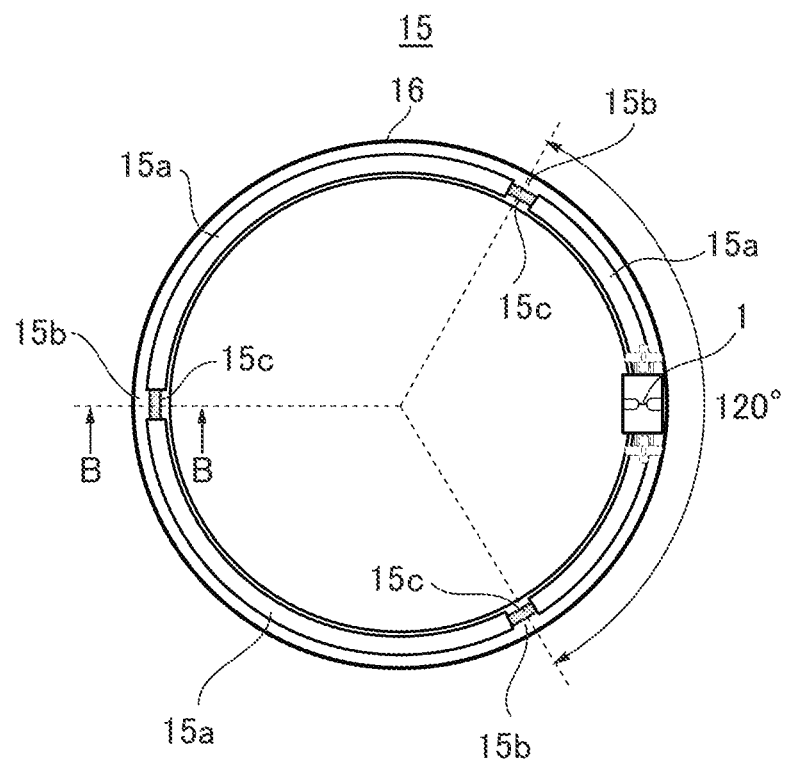
FIGS. 4A and 4B are a plan view and a cross-sectional view of a contact body of a vibration actuator according to a second embodiment of the present invention.
Figure 4B:
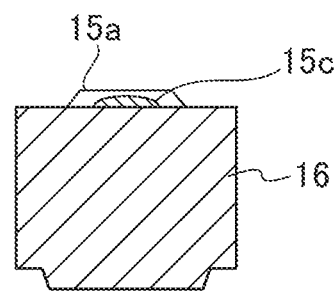

Next, a description will be given of a second embodiment of the present invention. The second embodiment differs from the first embodiment in that a first variation of the contact body 5 is used. FIG. 4A is a plan view showing one of the three vibration elements 1 that drive a contact body 15 according to the second embodiment, in a state overlaid on the contact body 15. FIG. 4B is a cross-sectional view taken along B-B in FIG. 4A. The contact body 15 has three sliding portions 15a, each having an arc shape and substantially the same length, formed on an upper surface of an annular metallic sintered body 16, at equally-spaced intervals in the circumferential direction, and three recessed portions 15b (non-sliding portions) each provided between adjacent ones of the sliding portions 15a, with a resin lump portion 15c being formed in each recessed portion 15b.

The main body of the contact body 15 is the metallic sintered body, similar to the main body of the contact body 5, described in the first embodiment. Further, application of the particle-mixed resin to the metallic sintered body, heat treatment for impregnation and curing, grinding, polishing, and so forth are performed in the same manner as in the first embodiment, and hence description thereof in the present embodiment is omitted.

Similar to the first embodiment, the particle-mixed resin is annularly applied on the upper surface of the metallic sintered body using the syringe. In doing this, the same amount of particle-mixed resin per unit length is applied to each of the three sliding portions 15a and the three recessed portions 15b. That is, the operation for applying the particle-mixed resin for forming the sliding portions 15a and the resin lump portions 15c can be performed in one operation, and hence it is possible to make the particle-mixed resin application process more simple than the particle-mixed resin application process in the first embodiment.

The state immediately after applying the particle-mixed resin on each of the sliding portions 15a and the recessed portions 15b is the same as the state immediately after annularly applying the particle-mixed resin on the upper surface (application surface) of the metallic sintered body 13 in the first embodiment. After that, similar to the first embodiment, by performing heat treatment for impregnating the particle-mixed resin into the metallic sintered body and curing the particle-mixed resin, and grinding and polishing of the sliding portions 15a, the contact body 15 having the cross-sectional structure, shown in FIG. 4B, is obtained.

The resin lump portion 15c in each recessed portion 15b is formed to have its upper surface lower than the sliding surface of the sliding portion 15a. With this, similar to the resin lump portion 12a in the first embodiment, the resin lump portion 15c is prevented from having its surface scraped and made rough due to grinding and polishing and the smooth surface after curing is preserved. Therefore, it is possible to clearly observe the organization of the resin lump portion 15c using an optical microscope, whereby it is possible to obtain the same advantageous effects as provided by the first embodiment, such as the effect of enabling verification of the state (the mixture ratio and the dispersion state) of the hard particles in the resin impregnated in the sliding portion 15a.

Note that in the present embodiment, the vibration elements 1 included in the vibration element unit 10 (see FIG. 1B) are arranged on the three sliding portions 15a, respectively. It is necessary to control the rotational angle of the contact body 15 so as to prevent the protrusions 2b of each vibration element 1 from falling into the recessed portion 15b when the contact body 15 is rotated. Since the sliding portions 15a are formed to approximately equally divide the whole circumference of the contact body 15 into three, the rotational angle of the contact body 15 must not exceed approximately 120°. In the present embodiment, a state of the three vibration elements 1, in which each vibration element 1 is positioned at the center of one sliding portion 15a in the circumferential direction, as shown in FIG. 4A, is set as the reference state. Then, the driving control is performed such that the contact body 15 is rotatable within a range of a total rotational angle of 90°, which is the sum of rotational angles of 45° in a clockwise direction and a counterclockwise direction from this reference state.

Further, although in the present embodiment, the sliding portions are formed to approximately equally divide the whole circumference of the contact body into three, the number of sliding portions, the rotational angle, and the number of vibration elements provided in the vibration element unit can be set according to a required rotational angle. For example, the sliding portions may be formed to approximately equally divide the whole circumference of the contact body into five, recesses may be provided between adjacent sliding portions, and a resin lump portion may be formed in each recess. In this case, the five vibration elements corresponding to the five sliding portions are provided in the vibration element unit, and the rotatable angle of the contact body can be set to be not larger than approximately 72° (e.g. 50°).

Figure 5A:
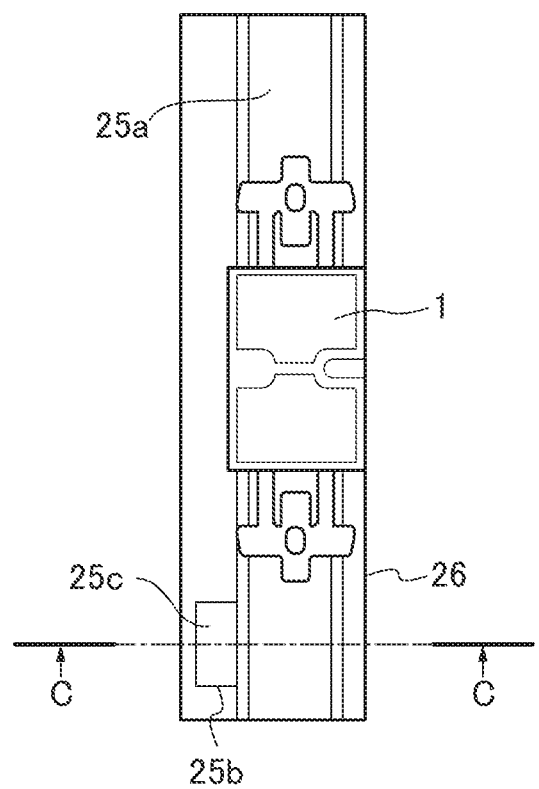
FIGS. 5A and 5B are a plan view and a cross-sectional view of a contact body of a vibration actuator according to a third embodiment of the present invention.
Figure 5B:
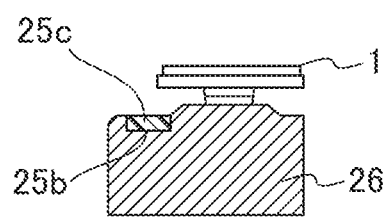

Next, a description will be given of a third embodiment of the present invention. The third embodiment differs from the first and second embodiments in that a second variation of the contact body 5 is used. FIG. 5A is a plan view showing a contact body 25 according to the third embodiment and the vibration element 1 which drives the contact body 25 in a state overlaid thereon. FIG. 5B is a cross-sectional view taken along C-C in FIG. 5A.

The contact body 25 is formed by embodying the contact body 5, described in the first embodiment, as a contact body of a linear drive-type vibration actuator. Note that the arrangement and the driving principle of the linear drive-type vibration actuator using the vibration element 1 are known, and hence description thereof in the present embodiment is omitted. Further, the contact body 25 has a metallic sintered body 26 having a bar shape (substantial prism shape) as a main body, and the metallic sintered body 26 has the same organization as that of the metallic sintered body 13 as the main body of the contact body 5, described in the first embodiment. Application of the particle-mixed resin to the metallic sintered body 26, the heat treatment for impregnation and curing, grinding, polishing, and so forth, are performed in the same manner as in the first embodiment, and hence description thereof in the present embodiment is omitted.

The contact body 25, having a bar shape, has a belt-like sliding portion 25a formed along a direction of the length of the contact body 25, and is formed with flat surfaces (non-sliding portion), each lower than the sliding surface of the sliding portion 25a by one step, on right and left sides of the sliding portion 25a (in a direction of the width of the sliding portion 25a). One of the flat surfaces is formed with a recessed portion 25b, and a resin lump portion 25c is formed in the recessed portion 25b. Similar to the first embodiment, the state of the resin lump portion 25c can be observed using e.g. an optical microscope, whereby it is possible to obtain the same advantageous effects as provided by the first embodiment. Note that the recessed portion 25b is only required to be provided in at least one of the right and left sides of the sliding portion 25a, and in a case where the recessed portions 25b are provided in both of the right and left sides of the sliding portion 25a, the resin lump portion 25c may be formed in both of the recessed portions 25b.

Figure 6:
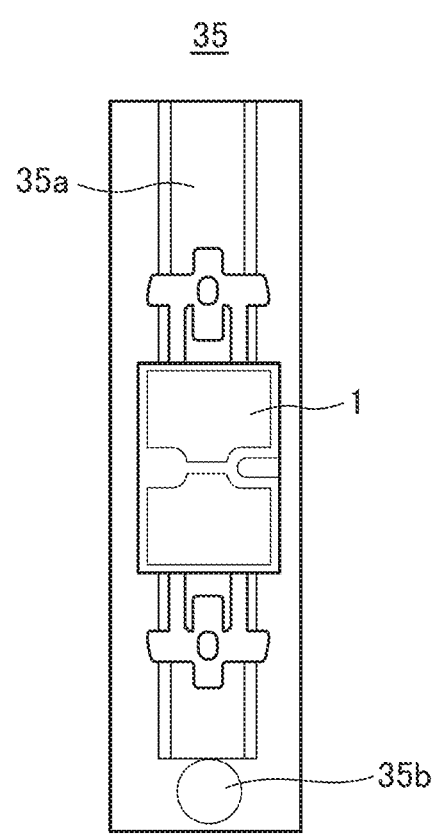
FIG. 6 is a plan view of a contact body of a vibration actuator according to a fourth embodiment of the present invention.

Next, a description will be given of a fourth embodiment of the present invention. The fourth embodiment differs from the first to third embodiments in that a third variation of the contact body 5 is used. FIG. 6 is a plan view of a contact body 35 according to the fourth embodiment, with the one vibration element 1 which drives the contact body 35, in a state overlaid thereon. Compared with the contact body 25 described in the third embodiment, the contact body 35 differs from the contact body 25 only in the position where the resin lump portion is formed, and is the same in the other respects of the arrangement as the contact body 25, and hence description of the other respects of the arrangement common between the contact body 35 and the contact body 25 is omitted.

In the contact body 35, a resin lump portion 35b is provided on an line, which is imaginary, extending from a sliding portion 35a. Similar to the contact body 15 described in the second embodiment, the resin lump portion 35b is formed on a flat surface (non-sliding surface) lower than the sliding surface of the sliding portion 35a by one step. Similar to manufacturing of the contact body 15 described in the second embodiment, manufacturing of the contact body 35 has an advantage that application of the particle-mixed resin to the sliding portion 35a and application of the particle-mixed resin for forming the resin lump portion 35b can be performed in one process.

Figure 7A:
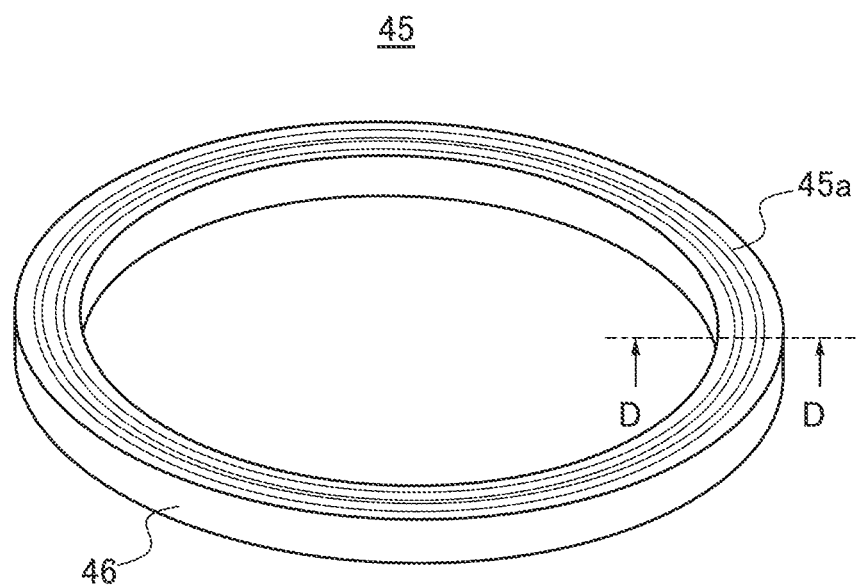
FIGS. 7A and 7B are a perspective view and a cross-sectional view of a contact body of a vibration actuator according to a fifth embodiment of the present invention.
Figure 7B:
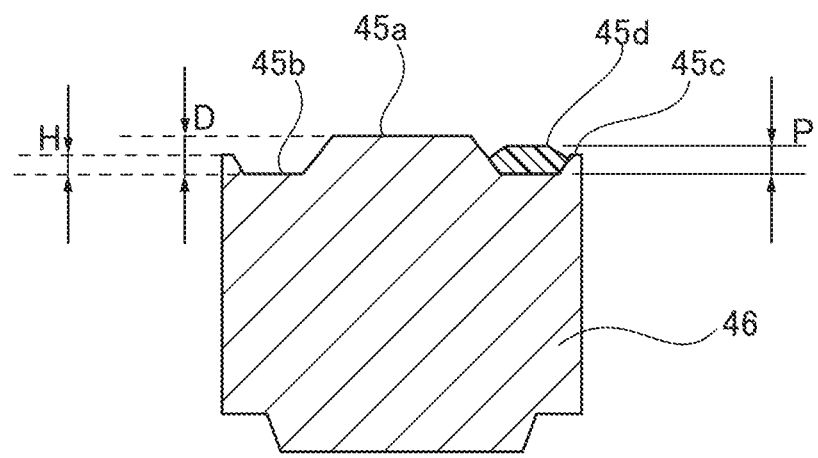

Next, a description will be given of a fifth embodiment of the present invention. The fifth embodiment differs from the first to fourth embodiments in that a fourth variation of the contact body 5 is used. FIG. 7A is a perspective view of a contact body 45 according to the fifth embodiment. FIG. 7B is a cross-sectional view taken along D-D in FIG. 7A.

The main body of the contact body 45 is a metallic sintered body 46, which is the same as the main body of the contact body 5 described in the first embodiment. An upper surface of the annular contact body 45 is annularly formed with a sliding portion 45a on the central portion (intermediate portion between an inner periphery and an outer periphery) in the radial direction, and an inner peripheral end portion and an outer peripheral end portion each formed with a wall portion 45c lower in height than the sliding portion 45a. Further, an annular groove 45b is formed between the sliding portion 45a and each wall portion 45c. The height H of each wall portion 45c from a bottom surface of the groove 45b is equal to or lower than the height D of the sliding portion 45a from the bottom surface of the groove 45b (H≤D).

The particle-mixed resin application process is performed according to the process for applying the particle-mixed resin 12 in the first embodiment, and after applying the particle-mixed resin to the sliding portion 45a, the particle-mixed resin is applied to at least part of the grooves 45b on the inner peripheral side and the outer peripheral side. In doing this, the amount of the particle-mixed resin applied to the groove 45b is controlled to such an amount as will not cause overflow from the wall portion 45c. Then, the contact body 45 formed with a resin lump portion 45d, having the height P from the bottom surface of the groove 45b, lower than the height D (P<D) of the sliding portion 45a from the bottom surface of the groove 45b, is obtained. The resin lump portion 45d is prevented from having its surface scraped and made rough due to grinding and polishing performed on the sliding portion 45a and the smooth surface after curing is preserved. Therefore, similar to the first embodiment, the state of the resin lump portion 45d can be observed using e.g. an optical microscope, whereby it is possible to obtain the same advantageous effects as provided by the first embodiment.

Note that the main purpose of providing the wall portions 45c is to prevent the particle-mixed resin applied to the groove 45b from flowing out of the periphery (to the inner peripheral side or the outer peripheral side), and hence the height H of the wall portion 45c is only required to be in a range in which this purpose can be achieved. For example, even if the height H of the wall portion 45c is approximately not lower than 0.01 mm and not higher than 0.02 mm (corresponding to a burr of an edge, formed in the process for manufacturing the metallic sintered body), the effect of preventing the particle-mixed resin from flowing out of the periphery can be obtained.

As described above, according to the embodiments of the present invention, it is possible to provide a resin lump portion, which is formed by curing particle-mixed resin, on a contact body, which includes a sliding portion formed by impregnating the particle-mixed resin into a metallic sintered body as a main body, in a state clearly observable by using an optical microscope. With this, by inspecting the state of the resin lump portion, it is possible to easily verify the state of the hard particles and the resin in the sliding portion. Therefore, it is possible to easily perform quality control of the manufactured contact body, which prevents a defective product of the contact body from being used in the process for manufacturing the vibration actuator, and as a result, it is possible to improve the production yield. Further, even when a defect occurs in the vibration actuator, it is possible to easily verify whether or not the cause of the defect is the contact body.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-200209 filed Oct. 24, 2018, which is hereby incorporated by reference herein in its entirety.

What is claimed is:

1. A contact body that has a metallic sintered body having a plurality of pores, as a main body, and is brought into contact with a vibration element in a vibration actuator, comprising:
   a sliding portion that has a sliding surface in contact with the vibration element; and
   a non-sliding portion that is adjacent to the sliding portion and is not in contact with the vibration element,
   wherein the non-sliding portion is provided with a resin lump containing hard particles and resin, and the resin lump is formed such that the resin lump is lower in height in a vertical direction than the sliding surface, and
   wherein in the sliding portion, part of hard particles and resin is exposed on the sliding surface.

2. The contact body according to claim 1, wherein the non-sliding portion has a surface formed at a location lower than the sliding surface, and the resin lump is formed on the surface.

3. The contact body according to claim 2, wherein the surface of the non-sliding portion is formed with a recessed portion and the resin lump is formed in the recessed portion.

4. The contact body according to claim 2, wherein the non-sliding portion is formed with a wall portion which is higher than the surface formed at the location lower than the sliding surface, and is lower than the sliding surface, such that the surface is provided between the wall portion and the sliding portion.

5. The contact body according to claim 4, wherein the height of the wall portion is not smaller than 0.01 mm.

6. The contact body according to claim 2, wherein the metallic sintered body has an annular shape,
   wherein the sliding portion is annularly formed on one surface of the metallic sintered body in an axial direction, and
   wherein the non-sliding portion is provided on at least one of an inner peripheral side and an outer peripheral side of the sliding portion which is annularly formed.

7. The contact body according to claim 2, wherein the metallic sintered body has an annular shape,
   wherein the sliding portion is formed on one surface of the metallic sintered body in an axial direction, such that arc-shaped sliding portions each having substantially the same length are formed at equally-spaced intervals, and
   wherein the non-sliding portion is formed between the arc-shaped sliding portions.

8. The contact body according to claim 2, wherein the metallic sintered body has a bar shape,
   wherein the sliding portion is formed in a belt-like shape along a direction of the length of the metallic sintered body, and
   wherein the non-sliding portion is formed on at least one side of the belt-shaped sliding portion in a direction of the width of the sliding portion.

9. The contact body according to claim 2, wherein the metallic sintered body has a bar shape,
   wherein the sliding portion is formed in a belt-like shape along a direction of the length of the metallic sintered body, and
   wherein the non-sliding portion is provided on a line extending from the sliding portion in a direction of the length of the sliding portion.

10. A vibration actuator including a vibration element, and a contact body that has a metallic sintered body having a plurality of pores, as a main body,
   wherein the contact body comprises:
   a sliding portion that has a sliding surface in contact with the vibration element; and
   a non-sliding portion that is adjacent to the sliding portion and is not in contact with the vibration element,
   wherein the non-sliding portion is provided with a resin lump containing hard particles and resin, and the resin lump is formed such that the resin lump is lower in height in a vertical direction than the sliding surface, and
   wherein in the sliding portion, part of hard particles and resin is exposed on the sliding surface.

* * * * *